Feb. 12, 1924.

J. W. SHEPARD

PACKING

Filed June 21, 1922

1,483,750

WITNESSES
H. J. Walker
A. L. Kitchin

INVENTOR
J. W. SHEPARD
BY
ATTORNEYS

Patented Feb. 12, 1924.

1,483,750

UNITED STATES PATENT OFFICE.

JOHN W. SHEPARD, OF TUCSON, ARIZONA.

PACKING.

Application filed June 21, 1922. Serial No. 569,914.

*To all whom it may concern:*

Be it known that I, JOHN W. SHEPARD, a citizen of the United States, and a resident of Tucson, in the county of Pima and State of Arizona, have invented a new and Improved Packing, of which the following is a full, clear, and exact description.

This invention relates to packing for pistons, segments, valves and other devices which oscillate or move back and forth in a suitable support and has for an object to provide an improved construction of bearing and packing rings wherein the bearing rings possess the quality of expansion as well as carry the load and furnish the proper support for the packing rings.

Another object is to provide a simple construction which may be readily renewed and which will reduce or almost eliminate the wear on the piston.

A still further object is to provide a packing which is extremely simple in construction and readily applied or removed whereby repairs may be quickly and easily made at any time.

In the accompanying drawings—

Referring to the accompanying drawings by numerals, 1 indicates a piston rod or member adapted to move the piston 2. The invention has been shown as applied to a piston but it is, of course, evident that it may be applied to any other device which oscillates and which needs a packing of this kind. The piston 2 is preferably cast with an opening 3, whereby it is substantially hollow and therefore comparatively light but of ample strength to perform the functions desired. The periphery of the piston 2 is provided with an annular substantially rectangular depression 4 whereby upstanding rectangular beads 5 and 6 are presented.

Figure 1:
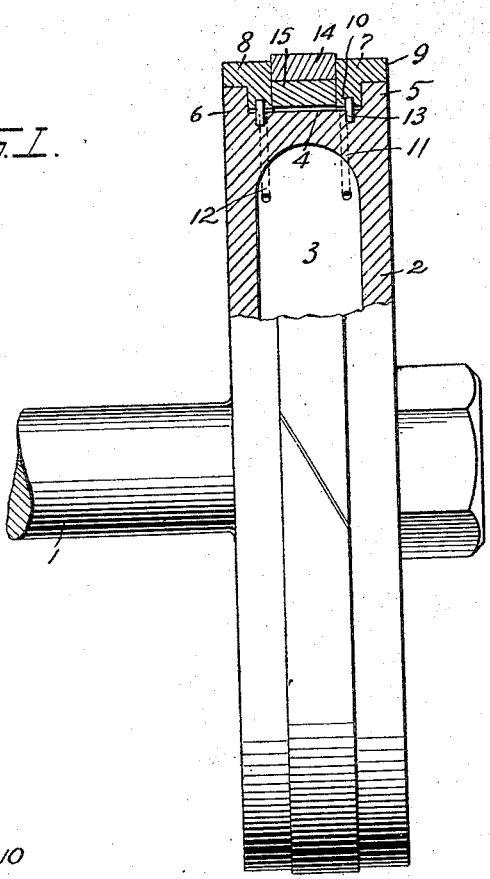
Figure 1 is a side view of part of a piston with an embodiment of the present invention applied thereto, certain parts being broken away for better illustrating the construction.
Figure 2:
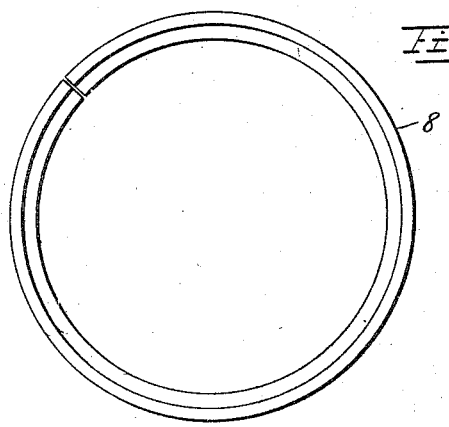
Fig. 2 is an elevation of one of the bearing rings shown in Fig. 1.

In order to provide a proper support for the piston 2, whereby it will not wear and yet the packing may be held properly in place, supporting or bearing rings 7 and 8 are provided, which rings are L-shaped in cross section and are divided at one point as shown in Fig. 2. The horizontal leg 9 of each of the bearing rings rests on the respective beads 5 and 6, and the down leg 10 of each bearing ring extends toward the bottom of the depression or recess 4 but preferably falls short of the bottom a slight distance, although, if desired, it may rest directly upon the bottom. As indicated in Fig. 1, vent holes 11 and 12 are provided in the piston 2 so that the core may be removed after casting and also to permit of expansion and contraction without injuring the parts. A pin 13 connects each of the bearing rings 7 and 8 to the piston 2 and prevents any independent rotation of the bearing rings, so that the piston will be supported in the cylinder by the bearing rings. Preferably the exterior surface of the bearing rings is turned slightly larger than the piston for which the rings are intended. The bearing rings are contracted when the piston with the bearing rings are placed in the cylinder. As the bearing rings wear or as the cylinder wears, the resilient effect of the bearing rings will cause them to spring outwardly and provide a constant contact with the piston, and in this way eliminate the hammering which is prevalent in certain pistons now in common use.

Arranged between the rings 7 and 8 are packing rings 14 and 15, the ring 14 taking all the wear while the ring 15 acts as a spring for urging the ring 14 outwardly. It will be observed that the sides of these rings are flat and bear against the rings 7 and 8 so that the rings 7 and 8 are held in proper place, and the rings 14 and 15 in turn are held in place by the bearing rings 7 and 8. The rings 14 and 15 are turned to such a size that they will assume substantially the position shown in Fig. 1, and subsequently they are compressed or restricted when forced into the cylinder. This arrangement permits these packing rings to expand and contract to provide the desired packing without acting as a support for the piston 2. It will be noted that there is a small space between the rings 14 and 15 and also between the rings 7 and 8 and the piston 2, said space being designed to carry oil whereby the parts will continually act in the proper manner.

Figure 3:
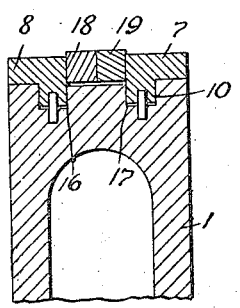
Fig. 3 is a fragmentary sectional view similar to the upper part of Fig. 1, showing a modified construction of packing.

In Fig. 3 a modified construction is shown which is believed to be a better construction or rather more adaptable to large cylinders, than that shown in Fig. 1. It will be understood that in the constructions shown in Fig. 1 and Fig. 3, the intermediate or packing rings are full floating and have no dowels to hold them in any position.

In the form of the invention shown in Fig. 3, instead of having a central depression 4, two annular grooves 16 and 17 are provided, which receive the down legs 10 of the rings 7 and 8. The packing rings 18 and 19 in this form of the invention are usually square in cross section and are arranged side by side instead of superimposed radially. In this way the respective rings may independently expand to maintain a proper contact with the cylinder.

The bearing rings and the packing rings have been described in connection with a piston and cylinder but it will be understood that they may be used in addition in connection with valves, segments or other devices which oscillate or move back and forth.

What I claim is:

1. In a packing of the character described, a piston, said piston at the periphery thereof being formed with a pair of annular grooves substantially rectangular in cross section, a pair of packing rings L-shaped in cross section and engaging the periphery of the piston with one leg depending into the respective grooves, each of said bearing rings being cut at one point, means for securing said bearing rings to said piston so that the bearing rings will not have independent rotary movement but will be permitted to expand, and a plurality of packing rings arranged between said bearing rings.

2. In a packing of the character described, a piston having a pair of annular rectangular grooves in the periphery, a pair of bearing rings L-shaped in cross section with one leg of each ring depending into the respective grooves, each of said rings being divided at one point and formed of such a size as to spring away from the piston when released, a pin engaging each of the bearing rings and the piston for preventing the bearing rings from having independent rotary movement, and a pair of packing rings arranged side by side between said bearing rings.

3. In a packing of the character described, a piston, a pair of annular spaced grooves in the periphery of said piston, a pair of bearing rings substantially L-shaped in cross section with one leg depending into said grooves, and a pair of packing rings arranged side by side positioned between the bearing rings.

JOHN W. SHEPARD.